Jan. 11, 1927.

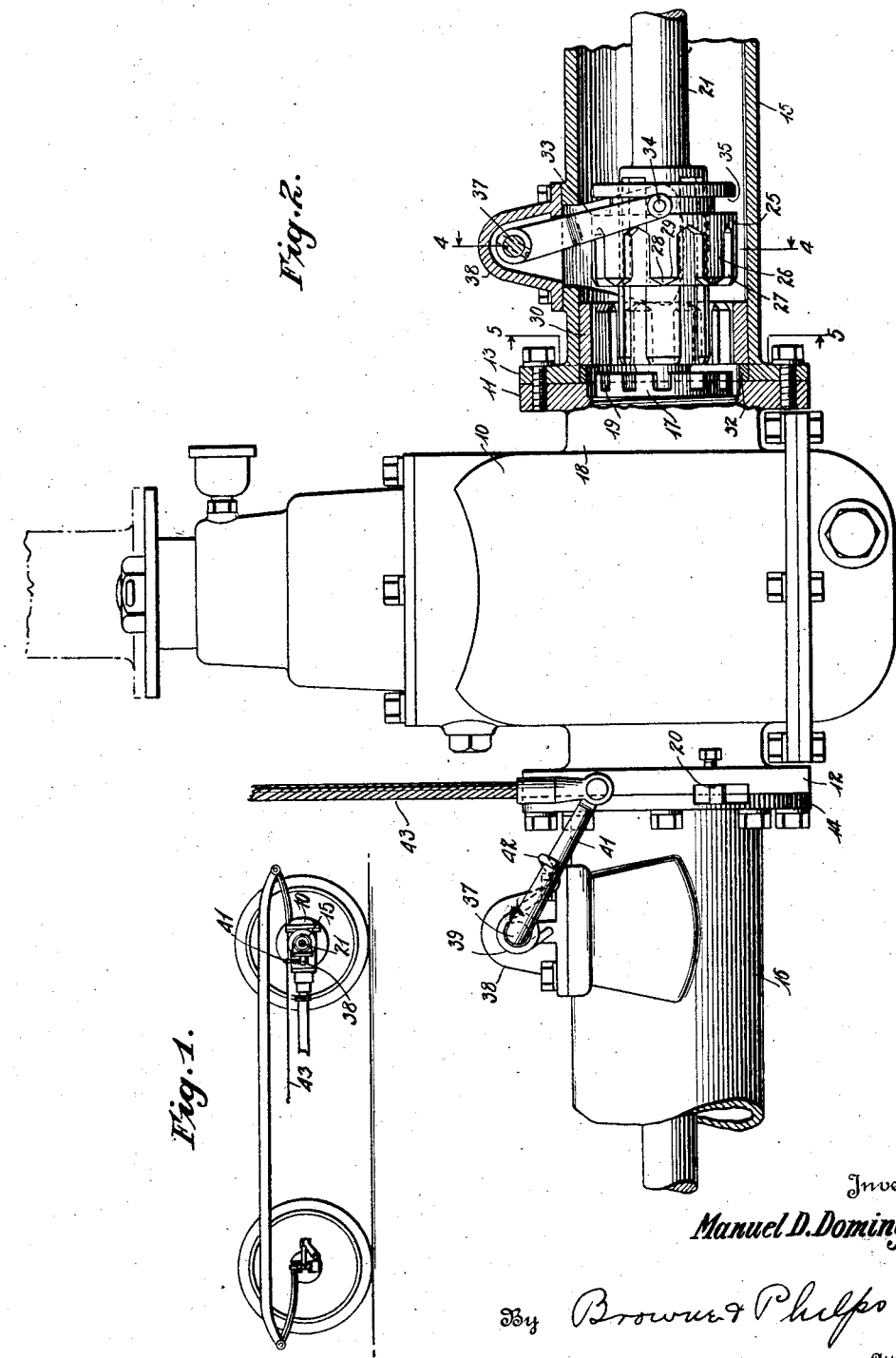

M. D. DOMINGUEZ 1,614,289

AUTOMOBILE TURNING DEVICE

Filed May 13, 1925   3 Sheets-Sheet 2

Inventor
Manuel D. Dominguez

By Brown & Phelps
Attorneys

Jan. 11, 1927.

M. D. DOMINGUEZ 1,614,289

AUTOMOBILE TURNING DEVICE

Filed May 13, 1925     3 Sheets-Sheet 3

Inventor
Manuel D. Dominguez

By Brown & Phelps
Attorneys

Patented Jan. 11, 1927.

1,614,289

UNITED STATES PATENT OFFICE.

MANUEL D. DOMINGUEZ, OF NEW ORLEANS, LOUISIANA, ASSIGNOR TO CHARLES A. DENIS AND GEORGE SARPY, OF NEW ORLEANS, LOUISIANA.

AUTOMOBILE TURNING DEVICE.

Application filed May 13, 1925. Serial No. 30,106.

The invention relates to devices for enabling an automobile to be turned in a small space. It is an object of the invention to provide a device which permits the turning of an automobile about either rear wheel as a pivot.

It is a further object of the invention to permit an automobile to be turned as referred to either to right or left, about either wheel.

It is a further object of the invention to provide a device adapted to positively lock both rear wheels when desirable.

Further objects of the invention will appear from the following description when read in connection with the accompanying drawing showing an illustrative embodiment of the invention, and in which—

Fig. 1 is a diagrammatic view of an automobile chassis having the device applied thereto.

Fig. 2 is a detail plan view partly in horizontal section of a differential housing and adjacent portions showing the application of the device of the invention thereto.

Figure 5:
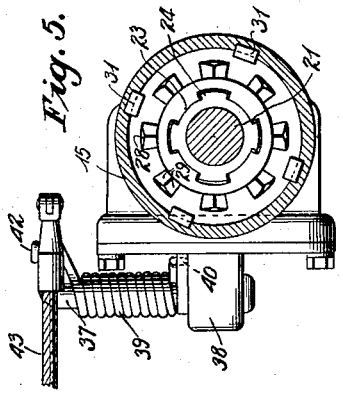
Figure 4:
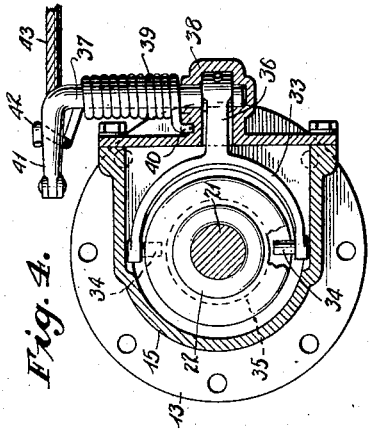
Figure 3:
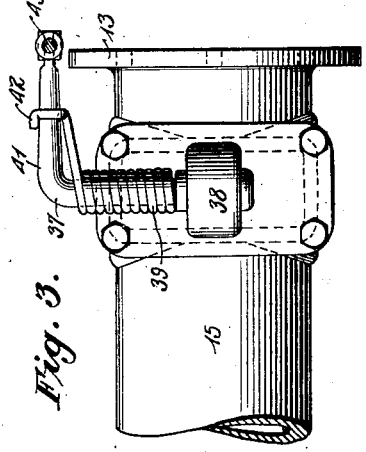
Fig. 3 is a detail elevation of one of the devices mounted upon the axle housing.

Figs. 4 and 5 are vertical transverse sections on lines 4—4 and 5—5 respectively of Fig. 2.

Figure 6:
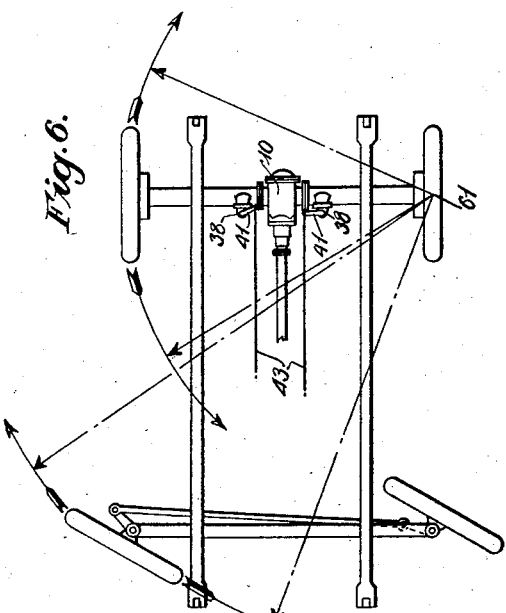

Fig. 6 is a diagrammatic view showing the movements of an automobile chassis with the device in operation.

Figure 7:
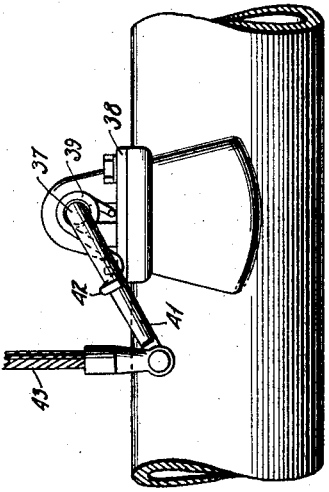

Fig. 7 is a detail plan view of the device as applied to an axle housing of the ordinary type.

Figure 8:
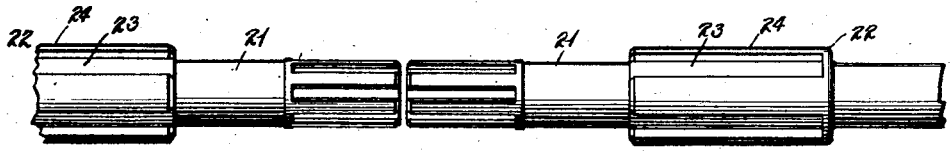

Fig. 8 is a detail elevation of the meeting ends of the drive shafts of the axle, showing a portion of one shaft equipped for the purposes of the invention.

Figure 9:
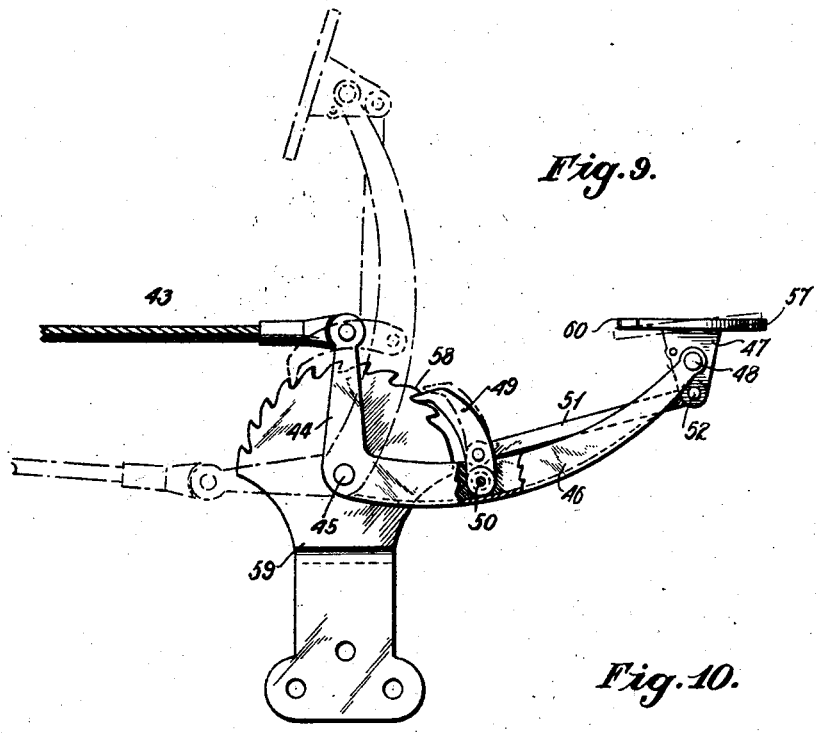

Fig. 9 is a detail elevation, and

Figure 10:
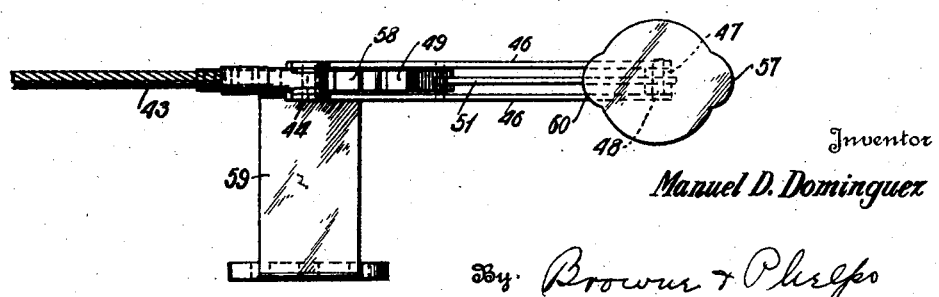

Fig. 10 is a detail plan view of a pedal for operating one of the devices of the invention.

As shown, the device is applied to a rear axle having a differential housing 10 of a usual form, which housing is shown as terminating laterally in flanges 11, 12, for attachment of the flanges 13, 14 carried by the axle housing 15, 16. There is shown a screw threaded nut 17 having screw threaded connection with the interior of the neck 18 of the differential housing, and having notches 19 accessible through an opening 20 for adjustment of the differential but forming no portion of the present invention.

According to the present invention, each of the drive shafts 21 is provided with an enlarged portion 22 carrying alternate grooves 23 and ribs 24.

Slidably mounted upon the enlarged portions 22 there is provided an annular member 25 formed internally with ribs and grooves complementary with the grooves 23 and ribs 24. The member 25 is also formed exteriorly with ribs 26 and grooves 27 extending a portion of the length of the member. The ends of the ribs 26 are shown as chamfered both vertically, as at 28, and laterally, as at 29.

Within the axle housings 15 and 16, there is placed an annulus 30, formed interiorly with grooves and ribs complementary to the ribs and grooves 26, 27. The openings to the last named grooves and ribs are also chamfered in such a manner that the annular member 25 may readily be slid into engagement with the annulus 30. The annulus 30 is rigidly secured to the interior of the axle housing 15, as by means of keys 31, and a ring 32 is shown to retain the same in position.

To slide the member 25 into and out of engagement with the annulus 30, there is shown a fork 33, carrying pins 34 projecting into a groove 35, in the member 25.

The shank 36 of the fork is shown as rigidly secured to a crank 37 pivoted in the cover 38 of the housing for the member 25. The fork 33 is held in the position shown in Fig. 2 by means of a spring 39 anchored in a hole 40 in the cover 38 and about the member 41 of the crank, as at 42. A cable 43 is shown for pulling upon the crank 37 to cause movement of the member 25.

It will be understood that one of the devices as described is applied to each of the drive shafts 21, so that either device may be operated to lock the selected shaft, or both may be operated to lock both of said shafts, if the machine is to be rendered immovable.

To control the device from the driver's seat, the cable 43 is shown as anchored to one arm 44 of a bell crank pivoted at 45, the opposite arm 46 of which carries a pedal 47 pivotally mounted at its end, at 48. The arms 46 of the bell crank are preferably formed double, as shown in Fig. 10. To lock the pedal in the desired position a pawl 49 is shown pivoted at 50, between the two members of the arm 46, and controlled by a link 51 connected at one end to the pawl, and at its opposite end 52 to a projection of the pedal 47 beyond its pivot. If the pedal be depressed, placing the pressure upon the upper end 53 thereof, the pawl will be pressed against the ratchet teeth 58 of the bracket 59, so as to lock the same in the position to which it is forced. When it is desired to release the pedal pressure upon the end 60 thereof will relieve the pressure upon the pawl, and will lift the same from the notches when the pedal may be allowed to return to the normal position shown in dotted lines in Fig. 9.

Two of the operating pedals will be provided, one of which may be utilized to lock either wheel upon which, with the gears placed in forward driving position, as low, the automobile will pivot about an axis, at 61, Fig. 6. With the same relation of parts and the gears placed in reverse, the opposite motion will be had about the same axis. The steering wheels must be turned to the limit of their motion to agree with the direction of the pivot and as determined by which wheel is locked.

By use of the device a minimum reorganization of the mechanism of the vehicle is required, and a machine may be turned about in substantially its own length.

Minor changes may be made in the physical embodiment of the invention without departing from its spirit.

I claim:

1. An automobile turning device comprising, in combination, a differential equipped vehicle, a pair of drive shafts having operative connection at all times with the differential thereof, a traction wheel mounted on each of said shafts, one of said shafts equipped with a series of separated ribs, a clutch member slidably mounted upon said shaft and having interior grooves to receive said ribs, an external axle housing, an annular member fixedly secured in said housing about said shaft and having interior grooves, a series of exterior ribs on said sliding member adapted to enter said last-named grooves, means for actuating said sliding member operable from a driver's seat upon said vehicle, whereby to positively lock a chosen traction wheel and drive shaft.

2. An automobile turning device comprising, in combination, a differential equipped vehicle, a pair of drive shafts having operative connection at all times with the differential thereof, a traction wheel mounted on each shaft, a series of longitudinal ribs carried by each shaft, a collar slidably mounted upon each said shaft and having grooves to receive said ribs, an axle housing for each of said shafts, an annular member fixedly mounted in each housing adjacent to the ribbed portion of the respective shafts, said annular members each having a series of internal grooves, each sliding member having external ribs adapted to enter said last-named grooves, forks having connection with the respective sliding members, a crank upon each of said forks pivotally to the respective axle housings, a pedal for control of each crank located adjacent the driver's position whereby to enable the driver at will to positively lock either or both of said drive shafts, and traction wheels.

3. An automobile turning device comprising, in combination, a pair of drive shafts, each secured to a wheel of the vehicle and to a differential pinion, differential mechanism in operative relation to said pinions, an enlarged portion fixedly carried by each shaft having a series of separated ribs upon its exterior, a clutch member slidably mounted upon said portions and having internal ribs meshing with said first-named ribs, an axle housing surrounding each of said shafts, an internal bushing secured within each housing and carrying internal ribs, a series of external ribs carried by each sliding member adapted to mesh with the interior ribs of said bushings, and means operable from the driver's seat to slide a chosen sliding member so as to positively lock the corresponding drive shaft, whereby to immovably secure the corresponding wheel and cause the differential to induce revolution of the remaining wheel.

4. An automobile turning device comprising, in combination, a differential equipped vehicle, a pair of drive shafts each extending continuously from a differential pinion to a wheel of the vehicle, and rigidly connected to each thereof, an enlarged portion secured to each shaft and having external splines, a sliding member having internal splines slidable upon each of said enlarged portions and having said internal splines continuously in mesh with said external splines, an axle housing surrounding each axle, a bushing rigidly secured to the interior of each axle housing and bearing internal splines, external splines carried by said sliding member adapted to be thrown into or out of mesh with the internal splines upon the corresponding bushing at will, whereby to positively lock the corresponding shaft and wheel, and means operable from the driver's seat to selectively operate a chosen one of said sliding members.

MANUEL D. DOMINGUEZ.